US010328784B2

(12) United States Patent
Beck et al.

(10) Patent No.: US 10,328,784 B2
(45) Date of Patent: Jun. 25, 2019

(54) PLANETARY GEARING DEVICE HAVING A PLURALITY OF PLANETARY GEAR SET SHAFTS AND AT LEAST ONE FURTHER ROTATABLY SUPPORTED SHAFT

(71) Applicant: ZF Friedrichshafen AG, Friedrichshafen (DE)

(72) Inventors: Stefan Beck, Eriskirch (DE); Marc Seeberger, Oberteuringen (DE); Michael Wechs, Weißensberg (DE); Jürgen Wafzig, Bermatingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 12 days.

(21) Appl. No.: 15/565,212

(22) PCT Filed: Mar. 23, 2016

(86) PCT No.: PCT/EP2016/056300
§ 371 (c)(1),
(2) Date: Oct. 9, 2017

(87) PCT Pub. No.: WO2016/169715
PCT Pub. Date: Oct. 27, 2016

(65) Prior Publication Data
US 2018/0093557 A1 Apr. 5, 2018

(30) Foreign Application Priority Data
Apr. 23, 2015 (DE) .................. 10 2015 207 508

(51) Int. Cl.
B60K 6/48 (2007.10)
B60K 6/365 (2007.10)
(Continued)

(52) U.S. Cl.
CPC ............... *B60K 6/365* (2013.01); *B60K 6/48* (2013.01); *B60K 6/547* (2013.01); *F16H 3/66* (2013.01);
(Continued)

(58) Field of Classification Search
CPC .......... B60K 6/365; B60K 6/48; B60K 6/547
See application file for complete search history.

(56) References Cited

U.S. PATENT DOCUMENTS 5,088,354 A * 2/1992 Asada ....................... F16H 3/66
475/276
5,203,862 A * 4/1993 Nishida ................... F16H 3/666
475/282

(Continued)

FOREIGN PATENT DOCUMENTS

DE 102009028670 A1 2/2011
DE 102009028699 A1 2/2011
(Continued)

OTHER PUBLICATIONS

German Search Report DE102015207508.7 dated Feb. 1, 2016. (7 pages).
(Continued)

*Primary Examiner* — Patrick H Mackey
(74) *Attorney, Agent, or Firm* — Dority & Manning, P.A.

(57) ABSTRACT

A planetary transmission includes a plurality of planetary gear sets. Each of the plurality of planetary gear sets has a plurality of planetary gear set shafts. At least one additional rotatably mounted shaft is connectable to at least one of the plurality of planetary gear set shafts by at least one shift element in order to realize at least one ratio. The at least one additional rotatably mounted shaft is also connectable into power flow between an input shaft and an output shaft by the at least one shift element. The at least one additional
(Continued)

rotatably mounted shaft is operatively connected directly to a component fixed to a housing, by which operative connection actuation energy for the at least one shift element is transferable from the component fixed to the housing into the at least one additional rotatably mounted shaft.

12 Claims, 2 Drawing Sheets

(51) Int. Cl.
    *B60K 6/547*     (2007.10)
    *F16H 3/66*     (2006.01)
    *F16H 61/00*     (2006.01)

(52) U.S. Cl.
    CPC ............ *B60K 2006/4816* (2013.01); *F16H 2061/0046* (2013.01); *F16H 2200/0008* (2013.01); *F16H 2200/0052* (2013.01); *F16H 2200/201* (2013.01); *F16H 2200/2043* (2013.01); *Y02T 10/6221* (2013.01); *Y02T 10/6256* (2013.01)

(56) References Cited

U.S. PATENT DOCUMENTS

| | | | |
|---|---|---|---|
| 5,887,670 A * | 3/1999 | Tabata | B60K 6/365 180/65.25 |
| 6,053,839 A | 4/2000 | Baldwin et al. | |
| 6,217,474 B1 * | 4/2001 | Ross | F16H 3/66 475/269 |
| 6,273,838 B1 * | 8/2001 | Park | F16H 3/666 475/280 |
| 7,033,298 B2 * | 4/2006 | Usoro | F16H 3/666 475/275 |
| 7,090,612 B2 * | 8/2006 | Ozeki | B60K 6/365 477/3 |
| 8,202,192 B2 * | 6/2012 | Iizuka | F16H 3/666 475/280 |
| 8,545,362 B1 | 10/2013 | Goleski et al. | |
| 2004/0266577 A1 * | 12/2004 | Stevenson | F16H 3/666 475/116 |
| 2008/0207386 A1 | 8/2008 | Nishida et al. | |
| 2010/0190600 A1 | 7/2010 | Phillips et al. | |
| 2014/0256499 A1 | 9/2014 | Lippert et al. | |

FOREIGN PATENT DOCUMENTS

| | | |
|---|---|---|
| DE | 102014203679 A1 | 9/2014 |
| EP | 0453577 A1 | 10/1991 |

OTHER PUBLICATIONS

International Search Report (English Translation) PCT/EP2016/056300, dated May 30, 2016. (2 pages).

\* cited by examiner

|   | B1 | B2 | K1 | K2 | K3 |
|---|---|---|---|---|---|
| "1" | X | X |   | X |   |
| "2" | X |   |   | X | X |
| "3" | X |   | X |   | X |
| "4" | X |   | X | X |   |
| "5" |   |   | X | X | X |
| "6" |   | X | X | X |   |
| "R" |   | X |   | X | X |

PLANETARY GEARING DEVICE HAVING A PLURALITY OF PLANETARY GEAR SET SHAFTS AND AT LEAST ONE FURTHER ROTATABLY SUPPORTED SHAFT

FIELD OF THE INVENTION

The invention relates generally to transmissions having multiple planetary gear sets.

BACKGROUND

DE 10 2009 028 670 A1 disclosed a multi-stage transmission which is designed as a planetary transmission and which has nine forward gear ratios and one reverse gear ratio. The multi-stage transmission includes four planetary gear sets, eight rotatable shafts and six shift elements. A transmission input shaft of the multi-stage transmission is couplable by shift elements to different planetary gear set shafts of the planetary gear sets and thus constitutes a "free shaft." Since the transmission input shaft is operatively connected directly to a component fixed to a housing, the activation energy required for the actuation of the shift elements can, e.g., be conducted directly from the housing into the transmission input shaft and by the transmission input shaft to the shift elements.

A disadvantage here is however that the transmission input shaft must provide not only the actuation of the shift elements but also further functionalities, such as lubrication of various components of the multi-stage transmission, a drive of a transmission pump, a bearing function for components arranged thereon and the like, as a result of which a transmission input shaft of said type must be designed with undesirably high structural complexity and is therefore characterized by a cumbersome manufacturing process.

A planetary transmission which is likewise designed with a free shaft is known from U.S. Pat. No. 8,545,362 B1, wherein the free shaft is neither the transmission input shaft nor the transmission output shaft. The free shaft of the planetary transmission is however disadvantageously arranged in the region between planetary gear sets, as a result of which an actuation of shift elements of the planetary transmission by the free shaft can be realized only with undesirably great effort.

SUMMARY OF THE INVENTION

Example aspects of the present invention provide a planetary transmission device which can be produced easily and inexpensively.

In the planetary transmission device having multiple planetary gear sets with in each case multiple planetary gear set shafts, a transmission input shaft, a transmission output shaft and at least one further rotatably mounted shaft which, by at least one shift element, is connectable to at least one of the planetary gear set shafts in order to realize at least one ratio, and can be connected into the power flow between the transmission input shaft and the transmission output shaft. The further shaft is operatively connected directly to a component fixed to a housing, by which operative connection actuation energy for the at least one shift element can be introduced from the component fixed to a housing into the further shaft.

The planetary transmission device according to example aspects of the invention is designed with at least one transmission-internal shaft or with a free shaft which is neither the transmission input shaft nor the transmission output shaft and which is couplable by one or more shift elements to one or more planetary gear set shafts and which is additionally accessible directly from the housing with little outlay or is directly operatively connected to said housing. According to the invention, the further shaft, which by definition constitutes a "free shaft" of the planetary transmission device, is accessible to the desired extent directly from the housing. The design of the planetary transmission device according to example aspects of the invention makes it possible in a simple manner for an actuation force or actuation energy for actuating the at least one shift element to be conducted with little effort from the housing and via the further shaft to the shift element, and in particular for the transmission input shaft to be of simpler structural design relative to planetary transmissions known from the prior art, because in the case of the planetary transmission device according to example aspects of the invention, less functionalities have to be covered by the transmission input shaft.

Here, in an embodiment in which more than one shift element can be supplied in each case with actuation force or actuation energy from the housing via the operative connection and via the further shaft, the planetary transmission device according to example aspects of the invention can be designed with a low number of "rotary transmission devices" in the region of which actuation energy is transmitted to the rotating further shaft in each case proceeding from the static housing region; this results in low power losses.

In an advantageous embodiment of the planetary transmission device according to example aspects of the invention, at least one shift element formed as a clutch can be supplied with actuation force or actuation energy by an actuator arrangement via the operative connection and via the further shaft.

If the planetary transmission device includes at least three planetary gear sets and at least five shift elements, an actuation of the shift elements via the further shaft can be realized with little effort in relation to solutions known from the prior art because the actuation energy can be introduced from the housing into regions between the planetary gear sets, or conducted from the housing into said regions, in a simple manner in terms of construction via the further shaft.

If substantially all shift elements formed as clutches can be supplied with actuation force or actuation energy by an actuator arrangement via the further shaft, the planetary transmission device according to example aspects of the invention can be operated in a particularly simple manner in terms of construction.

In a refinement of the planetary transmission device according to example aspects of the invention which is likewise simple and inexpensive in terms of construction, the actuation force or actuation energy can be introduced from the component fixed to a housing into the shaft in the region of the operative connection between the further shaft and the component fixed to a housing.

Depending on the respective application, the actuation of the shift elements is performed by the actuator arrangement pneumatically and/or hydraulically and/or electrically and/or mechanically.

If the actuation force or actuation energy can be introduced into the further shaft in an axial and/or in a radial direction on a side of the transmission housing averted from the transmission input shaft, the planetary transmission device according to example aspects of the invention is particularly suitable for a front-transverse arrangement in a vehicle. This results from the fact that, in vehicles with a front-transverse arrangement, on the side of the transmission housing averted from the transmission input shaft, or on the engine-averted side of the planetary transmission device, there is usually sufficient structural space available for the arrangement of an actuator arrangement or at least of a coupling device for transmitting the actuation energy provided by the actuator arrangement into the further shaft.

In an embodiment of the planetary transmission device according to example aspects of the invention which is likewise easy to produce and simple in terms of construction, the actuation force or actuation energy for the at least one shift element for actuation can be introduced into said shift element in the region of a face surface of a free end of the further shaft.

If torque can be introduced into or discharged from the planetary transmission device in a radial direction in the region of the transmission output shaft, or if the planetary transmission device according to example aspects of the invention is designed with a lateral output for a front-transverse type of construction, the further shaft can for example be in the form of a solid shaft that can be rotatably mounted in the housing.

If the further shaft is in the form of a solid shaft, it can in turn, in the case of a hydraulic and/or pneumatic actuation of shift elements by the further shaft, be easily formed with the bores required for this purpose.

In an advantageous refinement of the planetary transmission device according to example aspects of the invention, the further shaft is formed at least with a longitudinal bore running substantially in the longitudinal direction of the further shaft, via which longitudinal bore the at least one shift element or multiple shift elements of the planetary transmission device can be supplied to the desired extent with actuation force or actuation energy provided for actuation purposes.

If the further shaft can be operatively connected to at least one electric machine or motor for the exchange of torque, depending on the design of the planetary transmission device the electric machine can be coupled with a high degree of freedom to one or more of the planetary gear set shafts by shift elements of the planetary transmission device which interact with the further shaft, and different operating modes, such as a generator mode, a motor drive of a vehicle drivetrain equipped with the planetary transmission device, a "boost" mode and the like, can be realized to the desired extent.

Both the features specified in the patent claims and the features specified in the following exemplary embodiment of the planetary transmission device according to the invention are suitable in each case individually or in any desired combination for refining the subject matter according to the invention.

Further advantages and advantageous embodiments of the planetary transmission device according to the invention will emerge from the patent claims and from the following exemplary embodiment which is described in principle with reference to the drawings.

DETAILED DESCRIPTION

Figure 1:
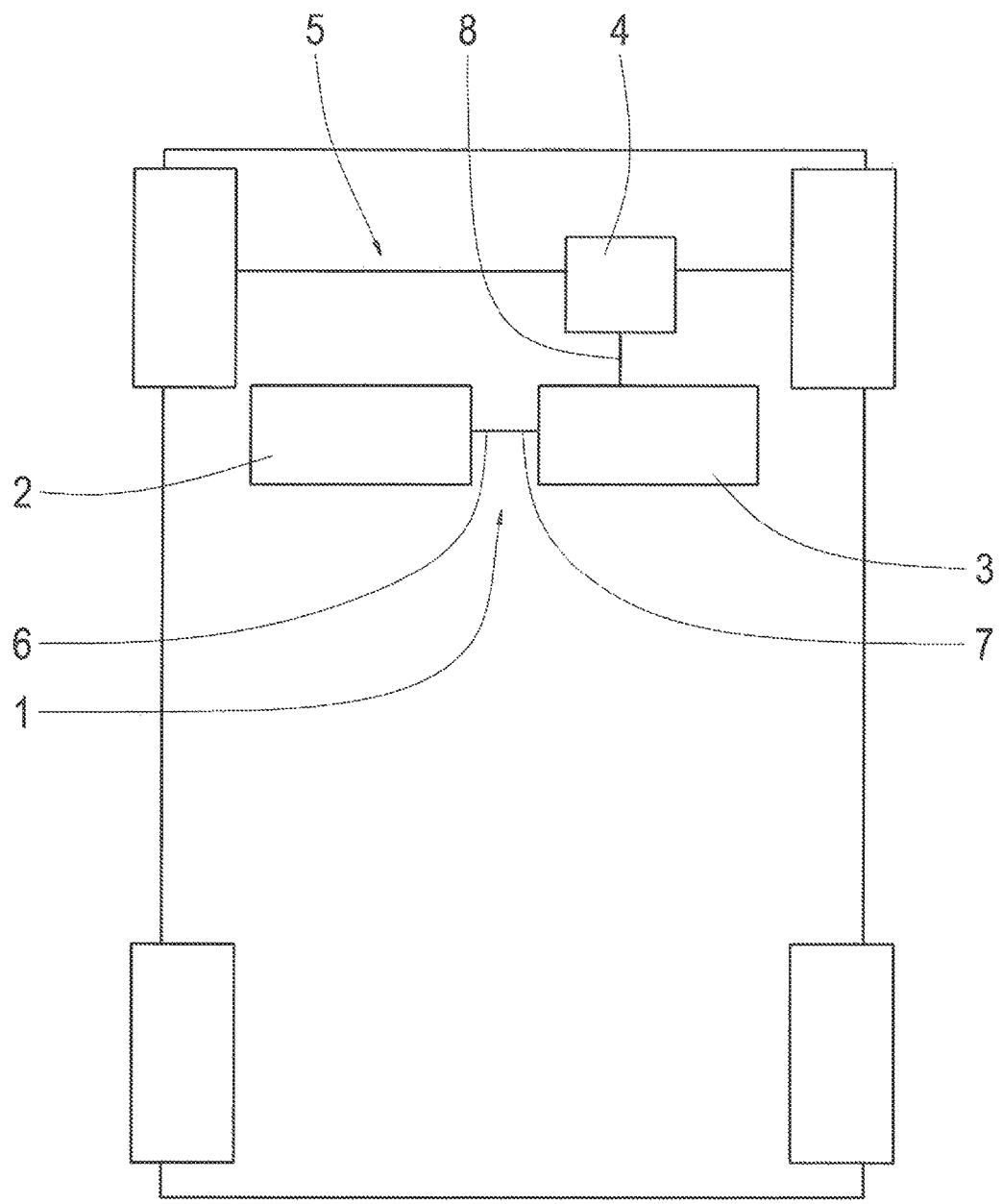
FIG. 1 is a highly schematic illustration of a vehicle drivetrain in a front-transverse arrangement.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a vehicle drivetrain 1 of a vehicle in a front-transverse arrangement having a drive machine or motor 2, a planetary transmission 3 and a differential 4 of a driveable vehicle front axle 5. The drive machine 2 is coupled by an engine output shaft 6 to a transmission input shaft 7 of the planetary transmission 3, whereas the planetary transmission 3 is operatively connected in the region of a transmission output shaft 8 to the differential 4.

Figures 2, 3:
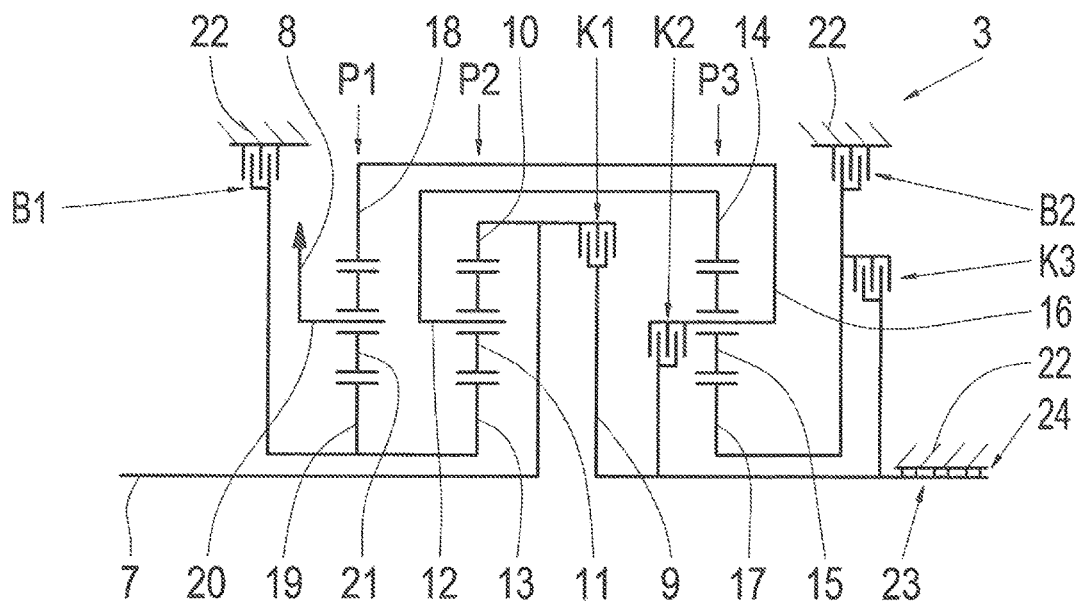
FIG. 2 shows a gear diagram of a preferred example embodiment of the planetary transmission device as per FIG. 1.
FIG. 3 shows an engagement sequence diagram of the example planetary transmission device as per FIG. 2.

FIG. 2 shows a gear scheme of a preferred example embodiment of the planetary transmission 3 as per FIG. 1 having three planetary gear sets P1 to P3, which in the present case are each in the form of three-shaft planetary gear sets with a respective sun gear 19, 13, 17, with respective planet gears 21, 11, 15, with a respective planet spider or planet carrier 20, 12, 16, and with a respective ring gear 18, 10, 14, or with a respective three planetary gear set shafts 19, 21, 20 and 13, 11, 12 and 17, 15, 16. The planetary gear set shafts 10 to 21 of the planetary gear sets P1 to P3 can in part be rendered rotationally fixed at the housing side by two shift elements B1, B2 formed as brakes. In the example planetary transmission 3 of FIG. 2, the planetary gear set shafts 12 and 14, the planetary gear set shafts 16 and 18 and the planetary gear set shafts 13 and 19 are in each case connected rotationally fixedly to one another. Furthermore, some of the planetary gear set shafts 10 to 21 of the planetary gear sets P1 to P3 are couplable rotationally fixedly to one another by three frictionally locking shift elements K1 to K3 formed as clutches. Furthermore, the planetary transmission 3 includes a further shaft 9 which is couplable by the shift elements K1 to K3 to the planetary gear set shafts 10, 16 and 12, 17 of the planetary gear sets P1 to P3 and which therefore, by definition, constitutes a "free shaft" of the planetary transmission 3.

Furthermore, FIG. 3 shows an engagement sequence diagram of the planetary transmission 3 as per FIG. 2, in which six ratios "1" to "6" for forward travel and one ratio "R" for reverse travel can be realized. Here, in the engagement sequence diagram as per FIG. 3, the letter X denotes in each case those shift elements K1 to K3 and B1, B2 which must be held in or transferred into the closed operating state in order to realize the respective ratio "1" to "R", whereas the respective other shift elements B1 to K3 must be held in or transferred into the open operating state. For example, the two brakes B1 and B2 and the shift element K2 must be held in or transferred into the closed operating state if a corresponding demand is present for realizing the first ratio "1" for forward travel. Then, a torque acting in the region of the transmission input shaft 7 is conducted to the ring gear 10 of the second planetary gear set P2 first, and transmitted via the planet gears 11 of the second planetary gear set P2 to the planet carrier 12 of the second planetary gear set P2. The planet gears 11, which mesh with the sun gear 13 of the second planetary gear set P2, roll to a corresponding extent on the sun gear 13 which is held rotationally fixed by the closed brake B1. The planet carrier 12 of the second planetary gear set P2 is connected rotationally fixedly to the ring gear 14 of the third planetary gear set P3, with which in turn the planet gears 15 of the third planetary gear set P3 mesh.

The planet gears 15 are arranged rotatably on the planet carrier 16 of the third planetary gear set P3, which when the clutch K2 is closed is connected rotationally fixedly to the further shaft 9. The sun gear 17 of the third planetary gear set P3 is held rotationally fixed by the likewise closed brake B2, whereby the torque of the drive machine 2 that is transmitted via the second planetary gear set P2 from the transmission input shaft 7 in the direction of the third planetary gear set P3 is conducted by the planet carrier 16 of the third planetary gear set P3 to the ring gear 18, which is connected rotationally fixedly to said planet carrier 16, of the first planetary gear set P1. The sun gear 19 of the first planetary gear set P1 is coupled rotationally fixedly to the sun gear 13 of the second planetary gear set P2 and is likewise held rotationally fixed by the closed brake B1, whereby the torque introduced via the ring gear 18 is conducted out of the planetary transmission 3, and is conducted onward in the direction of the differential 4, via the planet carrier 20 of the first planetary gear set P1, which is operatively connected to the transmission output shaft 8. The torque acting at the ring gear 18 is transmitted via the planet gears 21 of the first planetary gear set P1, which mesh with the ring gear 18 and the sun gear 19, to the planet carrier 20.

The further shaft 9 constitutes a transmission-internal shaft of the planetary transmission 3, which is neither the transmission input shaft 7 nor the transmission output shaft 8 of the planetary transmission 3 and which, by the shift elements K1 to K3, can be placed in operative connection with the planetary gear set shafts 10, 16 and 17 of the planetary gear sets P2 and P3 and with the planetary gear set shaft or the ring gear 18 of the first planetary gear set P1. Furthermore, the further shaft 9 is directly operatively connected to or rotatably mounted in a component fixed to a housing 22 or the transmission housing of the planetary transmission 3. A free shaft end 23 of the further shaft 9 is rotatably mounted in the transmission housing 22 on the side of the planetary transmission 3 averted or away from the drive machine 2 and is provided in the vehicle transverse direction on that side of the planetary transmission 3 which is averted from the drive machine 2.

In the present case, a hydraulic rotary transmission device 24 such as is known per se is provided in the region of the free shaft end 23 of the further shaft 9, by which rotary transmission device hydraulic fluid from the transmission housing 22 can be introduced in a radial direction into the further shaft 9 or into hydraulic lines which are provided therein and which are formed as bores. Via the bores of the further shaft 9, the clutches K1 to K3 can be charged with hydraulic fluid, and actuated to the desired extent.

In the case of the planetary transmission 3 as per FIG. 2, in each case the shift element halves of all shift elements K1 to K3 formed as clutches are coupled to the further shaft 9, whereby said shift element halves can be easily supplied with the actuation force required for actuation via the further shaft 9.

Owing to the arrangement of the free shaft end 23 on the side of the planetary transmission 3 averted from the drive machine 2, the actuation energy required for the actuation of the clutches K1 to K3 can be introduced in a locally limited space of the planetary transmission 3 directly from the transmission housing 22 into the free transmission-internal shaft 9.

Depending on the respectively present application, the clutches K1 to K3 may also, additionally or alternatively to the hydraulic actuation, be actuated via the shaft 9 electrically and/or pneumatically and/or mechanically to the desired extent proceeding from the free shaft end 23 via the shaft 9.

In the case of the present hydraulic actuation of the clutches K1 to K3 via the further shaft 9, which is in the form of a solid shaft, the clutches K1 to K3 are accessible with little effort from the transmission housing 22. Furthermore, by the connection to the further shaft 9, the clutches K1 to K3 can be arranged so as to be radially nested one inside the other in an expedient manner from a structural space aspect, whereby the planetary transmission 3 can be designed with a small structural space requirement in an axial direction.

Since no gearwheels are arranged on the further shaft 9, the further shaft 9 only has to be supported in a radial direction in the transmission housing 22 by corresponding radial bearings, which is simple from a construction aspect.

Furthermore, depending on the respectively present application, it is possible for the shift elements K1 to K3 that are connected to the further shaft 9 to be designed as positively locking shift elements, such as dog-clutch shift elements, synchronizers and the like, or as frictionally locking shift elements, such as multi-disk clutches and the like.

Modifications and variations can be made to the embodiments illustrated or described herein without departing from the scope and spirit of the invention as set forth in the appended claims.

REFERENCE DESIGNATIONS

1 Vehicle drivetrain
2 Drive machine
3 Planetary transmission device
4 Differential
5 Driveable vehicle front axle
6 Engine output shaft
7 Transmission input shaft
8 Transmission output shaft
9 Further shaft
10 Ring gear of the second planetary gear set
11 Planet gears of the second planetary gear set
12 Planet carrier of the second planetary gear set
13 Sun gear of the second planetary gear set
14 Ring gear of the third planetary gear set
15 Planet gears of the third planetary gear set
16 Planet carrier of the third planetary gear set
17 Sun gear of the third planetary gear set
18 Ring gear of the first planetary gear set
19 Sun gear of the first planetary gear set
20 Planet carrier of the first planetary gear set
21 Planet gears of the first planetary gear set
22 Component fixed to a housing, transmission housing
23 Free shaft end of the further shaft
24 Hydraulic rotary transmission device
B1, B2 Brake, shift element
K1-K3 Clutch, shift element
P1 First planetary gear set
P2 Second planetary gear set
P3 Third planetary gear set
"1"-"6" Ratio for forward travel
"R" Ratio for reverse travel

The invention claimed is:

1. A planetary transmission (3), comprising:
a plurality of planetary gear sets (P1 to P3), each of the plurality of planetary gear sets (P1 to P3) having a plurality of planetary gear set shafts (10 to 21);
an input shaft (7);
an output shaft (8);
at least one additional rotatably mounted shaft (9); and
at least one shift element (K1 to K3),
wherein the at least one additional rotatably mounted shaft (9) is connectable to at least one of the plurality of planetary gear set shafts (10, 16, 17, 18) by the at least one shift element (K1 to K3) in order to realize at least one ratio,
wherein the at least one additional rotatably mounted shaft (9) is connectable into power flow between the input shaft (7) and the output shaft (8) by the at least one shift element (K1 to K3),
wherein the at least one additional rotatably mounted shaft (9) is operatively connected directly to a component fixed to a housing (22), by which operative connection actuation energy for the at least one shift element (K1 to K3) is directly transferable from the component fixed to the housing (22) into the at least one additional rotatably mounted shaft (9), and
wherein the at least one rotatably mounted shaft (9) comprises a bore, the operative connection actuation energy for the at least one shift element (K1 to K3) being transferable from the component fixed to the housing (22) through the bore of the at least one rotatably mounted shaft (9) to the at least one shift element (K1 to K3).

2. The planetary transmission of claim 1, wherein one or more of the at least one shift element (K1 to K3) is a clutch, the clutch suppliable with the actuation energy by an actuator via the operative connection and the at least one additional rotatably mounted shaft (9).

3. The planetary transmission of claim 1, wherein the plurality of planetary gear sets (P1 to P3) comprises at least three planetary gear sets (P1 to P3), and the at least one shift element (K1 to K3) comprises at least five shift elements (B1, B2, K1 to K3).

4. The planetary transmission of claim 3, wherein one or more of the at least five shift elements (K1 to K3) is a clutch, the clutch suppliable with the actuation energy by an actuator via the at least one additional rotatably mounted shaft (9).

5. The planetary transmission of claim 4, wherein the actuation energy is transferable from the component fixed to the housing (22) into the at least one additional rotatably mounted shaft (9) at the operative connection between the at least one additional rotatably mounted shaft (9) and the component fixed to the housing (22).

6. The planetary transmission of claim 3, wherein actuation of the at least five shift elements (B1, B2, K1 to K3) is performed by the actuator one or more of pneumatically, hydraulically, electrically, and mechanically.

7. The planetary transmission of claim 3, wherein the actuation energy is transferable into the at least one additional rotatably mounted shaft (9) in one or more of an axial direction and a radial direction on a side of the housing (22) away from the input shaft (7).

8. The planetary transmission of claim 3, wherein the actuation energy is transferable into the at least one shift element (K1 to K3) at a face surface of a free end of the at least one additional rotatably mounted shaft (9).

9. The planetary transmission of claim 1, wherein torque is introducible or dischargeable from the planetary transmission (3) in a radial direction at the output shaft (8).

10. The planetary transmission of claim 1, wherein the at least one additional rotatably mounted shaft (9) is a solid shaft.

11. The planetary transmission of claim 1, wherein the bore of the at least one additional rotatably mounted shaft (9) comprises a longitudinal bore running substantially in a longitudinal direction of the at least one additional rotatably mounted shaft (9).

12. The planetary transmission of claim 1, wherein the at least one additional rotatably mounted shaft (9) is operatively connectable to at least one electric motor for torque exchange.

* * * * *